(12) United States Patent
Ohtsuka (10) Patent No.: US 10,880,485 B2
(45) Date of Patent: Dec. 29, 2020

(54) IMAGING APPARATUS FOR CONTROLLING DISPLAY OF A MICROPHONE LEVEL METER AND MUTE FUNCTION DURING MOVING IMAGE CAPTURE

(71) Applicant: Panasonic Intellectual Property Management Co., Ltd., Osaka (JP)

(72) Inventor: Yoshio Ohtsuka, Osaka (JP)

(73) Assignee: Panasonic Intellectual Property Management Co., Ltd, Osaka (JP)

( * ) Notice: Subject to any disclaimer, the term of this patent is extended or adjusted under 35 U.S.C. 154(b) by 66 days.

(21) Appl. No.: 16/190,597

(22) Filed: Nov. 14, 2018

(65) Prior Publication Data

US 2019/0082116 A1  Mar. 14, 2019

Related U.S. Application Data

(63) Continuation of application No. PCT/JP2018/004967, filed on Feb. 14, 2018.

(30) Foreign Application Priority Data

Aug. 1, 2017  (JP) ................................ 2017-148934

(51) Int. Cl.
*H04N 5/232* (2006.01)
*H04N 5/92* (2006.01)
*H04R 29/00* (2006.01)

(52) U.S. Cl.
CPC . *H04N 5/232939* (2018.08); *H04N 5/232933* (2018.08); *H04N 5/9202* (2013.01);
(Continued)

(58) Field of Classification Search
CPC ....... H04N 5/232933; H04N 5/232939; H04N 5/9202; H04N 5/232; H04N 5/92;
(Continued)

(56) References Cited

U.S. PATENT DOCUMENTS

2004/0017481 A1* 1/2004 Takasumi ............. H04N 5/2353
348/207.99
2006/0291666 A1* 12/2006 Ball ....................... G06F 3/165
381/58

(Continued)

FOREIGN PATENT DOCUMENTS

JP  2-126711  5/1990
JP  2004-080427  3/2004
(Continued)

OTHER PUBLICATIONS

The Extended European Search Report dated Jun. 24, 2019 for the related European Patent Application No. 18793158.9.
(Continued)

*Primary Examiner* — Twyler L Haskins
*Assistant Examiner* — Akshay Trehan
(74) *Attorney, Agent, or Firm* — Renner, Otto, Boisselle & Sklar, LLP (57) ABSTRACT

The present disclosure relates to an imaging apparatus that images a subject and allows recording of moving image data. A setting unit of the imaging apparatus receives first setting for setting ON or OFF of display of level meter (201) on display unit (190) and second setting for setting ON or OFF of a mute function which is a function of recording a sound indicating silence. When a moving image is captured, a controller of the imaging apparatus is configured such that, if the display of level meter (201) is OFF in the first setting, and further, when the mute function is ON in the second setting, at least one of level meter (201) and mute display (202) is displayed in display unit (190).

7 Claims, 7 Drawing Sheets

(52) U.S. Cl.
CPC ......... *H04R 29/004* (2013.01); *H04R 29/008* (2013.01); *H04R 2499/11* (2013.01)

(58) Field of Classification Search
CPC ......... H04N 5/23293; H04N 5/232935; H04N 5/232941; H04N 5/232945; H04R 29/004; H04R 2499/11; H04R 29/008
See application file for complete search history.

(56) References Cited

U.S. PATENT DOCUMENTS

| | | | | |
|---|---|---|---|---|
| 2009/0138110 | A1* | 5/2009 | Kohyama | H04R 29/007 700/94 |
| 2012/0281112 | A1* | 11/2012 | Ohtsuka | G03B 17/56 348/231.4 |
| 2015/0156598 | A1* | 6/2015 | Sun | H04N 7/147 348/14.07 |
| 2015/0194931 | A1* | 7/2015 | Otsuka | H03G 3/3005 381/120 |
| 2018/0367740 | A1* | 12/2018 | Ito | H04N 5/23203 |

FOREIGN PATENT DOCUMENTS

| | | |
|---|---|---|
| JP | 2004-274413 | 9/2004 |
| JP | 2012-039429 | 2/2012 |
| JP | 2012-085277 | 4/2012 |
| JP | 2015-130547 | 7/2015 |
| WO | 2017/115507 | 7/2017 |

OTHER PUBLICATIONS

International Search Report of PCT application No. PCT/JP2018/004967 dated Mar. 20, 2018.

* cited by examiner

IMAGING APPARATUS FOR CONTROLLING DISPLAY OF A MICROPHONE LEVEL METER AND MUTE FUNCTION DURING MOVING IMAGE CAPTURE

TECHNICAL FIELD

The present disclosure relates to an imaging apparatus capable of recording an image and a sound.

BACKGROUND ART

Unexamined Japanese Patent Publication No. 2015-130547 discloses a recording device equipped with a converter that acquires an external sound and converts the sound into a first signal, an amplifier that amplifies the first signal and generates a second signal, a recorder that records the second signal, a display unit that displays a level of the second signal, and a controller that controls the amplifier and the display unit. The amplifier has an auto level control (ALC) unit that adjusts an amplification degree of the amplifier according to the level of the second signal. The controller can select whether the ALC unit operates. When the ALC unit operates, the controller can select display or non-display of the level of the second signal in the display unit. On the other hand, when the ALC unit does not operate, the controller always displays the level of the second signal in the display unit. With this configuration, ON or OFF of ALC can be selected, and when the ALC is turned oft a recording level is automatically displayed. As a result, even when the ALC is turned off, the recording level can be confirmed, and occurrence of clipping can be monitored.

SUMMARY OF THE INVENTION

The present disclosure provides an imaging apparatus that reduces user's erroneous operation related to a mute function in an imaging apparatus capable of recording an image and a sound.

In one aspect of the present disclosure, an imaging apparatus that images a subject and allows recording of moving image data is provided. The imaging apparatus includes: a sound input unit, that inputs a sound and generates a sound signal; a display unit that displays a level meter indicating a level of the sound signal output from the sound input unit; a setting unit that receives first setting for setting ON or OFF of display of the level meter on the display unit and second setting for setting ON or OFF of a mute function which is a function of recording a sound indicating silence; and controller (130) that controls the display of the level meter on the display unit. When a moving image is captured, if the display of the level meter is ON in the first setting, the controller displays the level meter on the display unit. If the display of the level meter is OFF in the first setting, and further, when the mute function is OFF in the second setting, the controller does not display the level meter on the display unit. Alternatively, when the mute function is ON, the controller is configured such that at least one of the level meter and a mute display is displayed on the display unit. The mute display is a display indicating that the mute function is ON.

Further, in one aspect of the present disclosure, an imaging apparatus that images a subject and allows recording of moving image data is provided. The imaging apparatus includes: a sound input unit that inputs a sound and generates a sound signal; a setting unit that receives setting of ON or OFF of a mute function which is a function of recording a sound indicating silence; a display unit that displays a mute display indicating that the mute function is ON, when the mute function is ON; and a controller configured to display the mute display on the display unit.

BRIEF DESCRIPTION OF DRAWINGS

FIG. 6 is a view illustrating one example of display displayed in a display unit when a mute function is ON.

FIG. 8 is a view illustrating another example of the display displayed on the display unit when the mute function is ON.

FIG. 9 is a view illustrating still another example of the display displayed on the display unit when the mute function is ON.

DESCRIPTION OF EMBODIMENTS

Exemplary embodiments will be described in detail below with reference to the drawings as appropriate. However, a detailed description more than necessary may be omitted. For example, the detailed description of already well-known matters and the overlap description of substantially identical configurations may be omitted. This is to avoid the following description from being unnecessarily redundant and thus to help those skilled in the art to easily understand the description.

Here, the inventor provides the attached drawings and the following description such that those skilled in the art can sufficiently understand the present disclosure, and therefore, they do not intend to restrict the subject matters of claims.

First Exemplary Embodiment

With reference to the accompanying drawings, a description will be given below of a configuration and operation of a digital camera, which is one exemplary embodiment of an imaging apparatus according to the present disclosure.

[1-1. Configuration]

Figure 1:
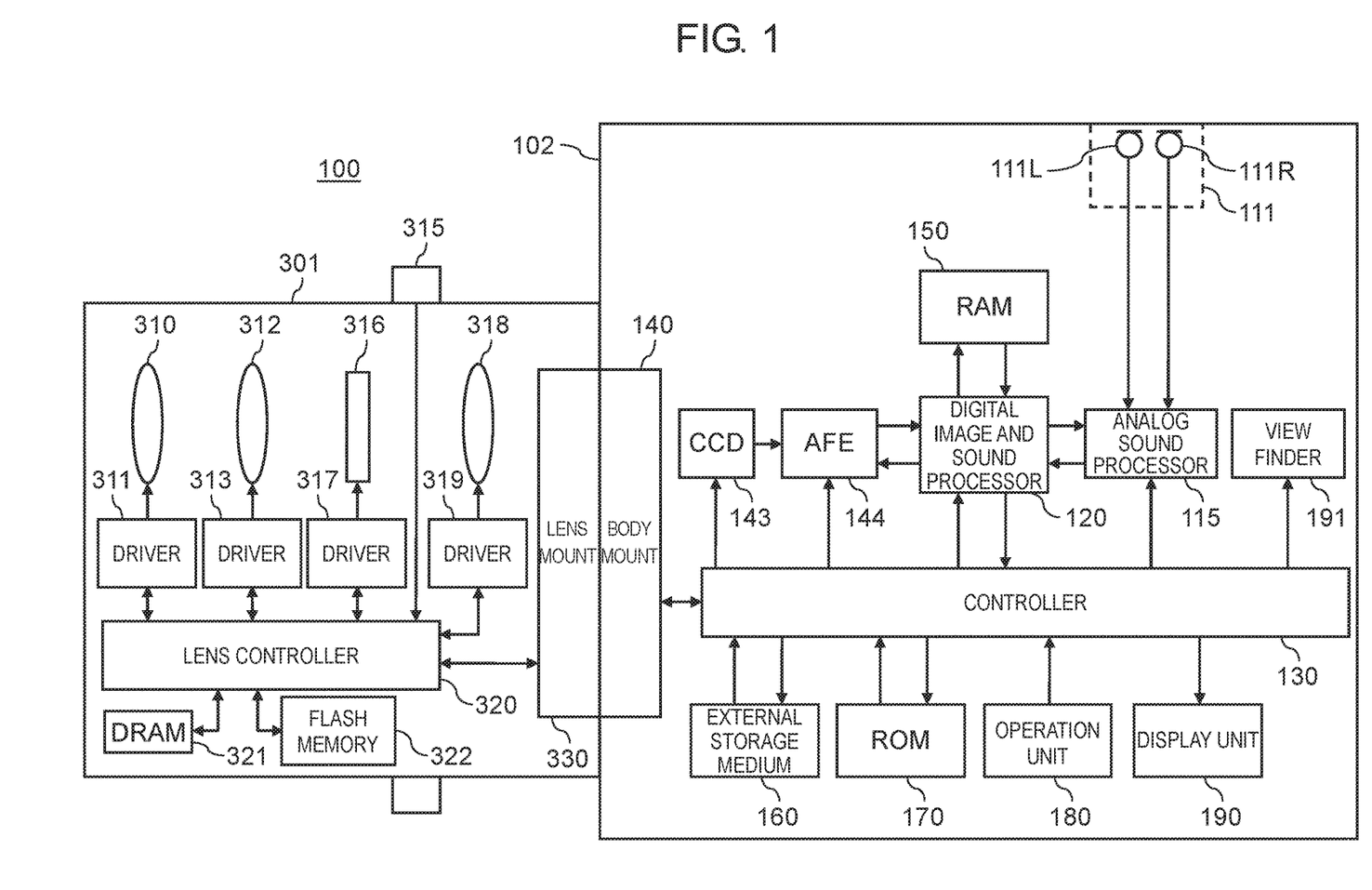
FIG. 1 is a diagram illustrating a configuration of a digital camera of the present disclosure.

FIG. 1 is a diagram illustrating the configuration of the digital camera, which is one exemplary embodiment of the imaging apparatus according to the present disclosure. Digital camera 100 images a subject and generates image data (a still image, a moving image) to record the image data on a recording medium. Digital camera 100 includes camera body 102 and interchangeable lens 301 attached to camera body 102.

[1-1-1. Interchangeable Lens]

Interchangeable lens 301 includes an optical system including focus lens 310, correcting lens 318, and zoom lens 312. Interchangeable lens 301 is further equipped with lens controller 320, lens mount 330, focus lens driver 311, zoom lens driver 313, diaphragm 316, diaphragm driver 317, operation ring 315, optical image stabilizer (OIS) driver 319, dynamic random access memory (DRAM) 321, flash memory 322, and the like.

Lens controller 320 controls entire operation of interchangeable lens 301. Lens controller 320 can control focus lens driver 311, OIS driver 319, and diaphragm driver 317, respectively, so as to drive focus lens 310, correcting lens 318, and diaphragm 316. Further, lens controller 320 receives operation of operation ring 315 performed by a user, and can control zoom lens driver 313 so as to drive zoom lens 312 in accordance with the operation.

OIS driver 319 is provided with a drive mechanism that includes a magnet and a planar coil, for example. OIS driver 319 controls the drive mechanism based on a detection signal of a gyro sensor (not illustrated) that detects unsteadiness of interchangeable lens 301 and shifts correcting lens 318 in a plane vertical to an optical axis of the optical system in accordance with the unsteadiness of interchangeable lens 301. As a result, an influence of unsteadiness caused by camera shake in a picked up image can be reduced.

Lens controller 320 is connected to DRAM 321 and flash memory 322, and writes or reads information in or from these memories as necessary. In addition, lens controller 320 communicates with controller 130 in camera body 102 via lens mount 330. Lens controller 320 may be configured with a hard-wired electronic circuit or with a microcomputer using a program, for example.

Lens mount 330 is connected to body mount 140 of camera body 102, and mechanically and electrically connects interchangeable lens 301 and camera body 102. When interchangeable lens 301 is connected to camera body 102, lens controller 320 and controller 130 can communicate with each other. Body mount 140 can transmit a signal received from lens controller 320 via lens mount 330 to controller 130 in camera body 102.

[1-1-2. Camera Body]

Camera body 102 includes charge coupled device (CCD) image sensor 143 and analog front end (AFE) 144.

CCD image sensor 143 captures a subject image formed through interchangeable lens 301 and generates image information. Note that another kind of image sensor (for example, a complementary metal oxide semiconductor (CMOS) image sensor) may be used as the image sensor.

With respect to the image information read from CCD image sensor 143, AFE 144 suppresses a noise through correlated double sampling, causes an analog gain controller to perform amplification to an input range width for an analog/digital (A/D) converter, and causes the A/D converter to perform A/D conversion.

Camera body 102 further includes sound input unit 111 and analog sound processor 115. Sound input unit 111 includes two microphones 111L, 111R that independently pick up main sounds (sounds from a recording target) which are coming from left and right directions. Each of microphones 111L, 111R converts a sound signal into an electric signal (an analog sound signal). The analog sound signal from each of microphones 111L, 111R is input to analog sound processor 115.

Analog sound processor 115 amplifies the analog sound signal input from sound input unit 111 and converts the amplified analog sound signal into a digital sound signal. Then, analog sound processor 115 outputs the digital sound signal to digital image and sound processor 120.

Figure 2:
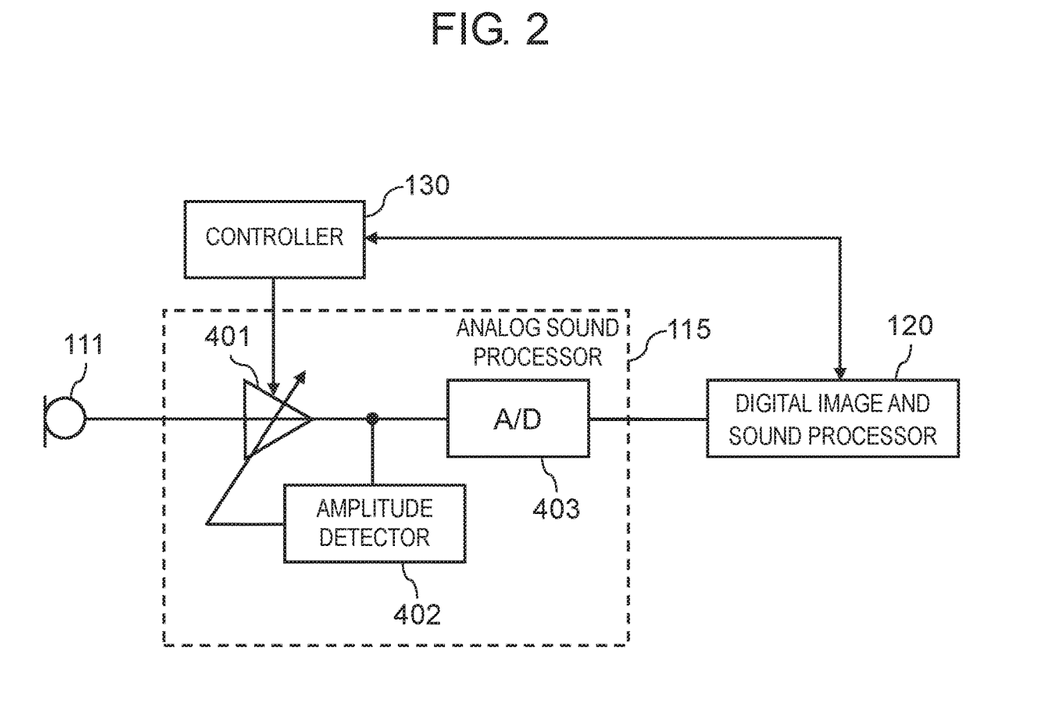
FIG. 2 is a diagram illustrating a configuration of an analog sound processor in the digital camera.

FIG. 2 is a block diagram illustrating a configuration of analog sound processor 115. Analog sound processor 115 includes amplifier 401, amplitude detector 402, and A/D converter 403. Analog sound processor 115 causes amplifier 401 to amplify the analog sound signal received from sound input unit 111 at a predetermined gain, and outputs the amplified analog sound signal to A/D converter 403. A/D converter 403 receives the analog sound signal amplified by amplifier 401 to perform A/D conversion. A/D converter 403 outputs the A/D converted sound signal to digital image and sound processor 120. Amplitude detector 402 receives the sound signal amplified by amplifier 401 and feedback-controls a gain of amplifier 401 such that an amplitude of the analog sound signal does not exceed an input permissible level of A/D converter 403. Analog sound processor 115 is configured with an electronic circuit including an analog circuit and may be configured with one or a plurality of semiconductor integrated circuit(s).

Analog sound processor 115 can change a level indicating magnitude of an analog sound signal (hereinafter referred to as a "microphone level") by changing a gain. The microphone level can be set by a user. Controller 130 outputs a control signal instructing the gain of amplifier 401 to analog sound processor 115 according to a set value of the microphone level set by the user. Analog sound processor 115 adjusts the gain according to this control signal and controls a level of the analog sound signal.

Digital image and sound processor 120 executes various processes on image information output from AFE 144 and on a sound signal output from analog sound processor 115. For example, digital image and sound processor 120 executes gamma correction, white balance correction, defect correction, encoding process, and the like on the image information in accordance with an instruction from controller 130. In addition, digital image and sound processor 120 executes various processes on the sound signal in accordance with an instruction from controller 130. Digital image and sound processor 120 may be achieved by a hard-wired electronic circuit or a microcomputer that executes a program, for example. A circuit that achieves digital image and sound processor 120 may be integrated into one or a plurality of semiconductor integrated circuit(s). Examples of digital image and sound processor 120 include a central processing unit (CPU), a field-programmable gate array (FPGA), an application specific integrated circuit (ASIC), and a digital signal processor (DSP).

Display unit 190 is disposed on a rear surface of digital camera 100. Display unit 190 is configured with a liquid crystal display or an organic electro luminescence (EL) display. Display unit 190 displays an image based on the image information processed by digital image and sound processor 120. Display unit 190 also includes a touch panel that enables user operation on a display image.

Controller 130 integrally controls entire operation of digital camera 100. Controller 130 may be achieved by a hard-wired electronic circuit or a microcomputer that executes a program, for example. Further, controller 130 may be achieved as one semiconductor chip integrally with digital image and sound processor 120, for example. For example, controller 130 alone or integrated with digital image and sound processor 120 is configured with a CPU, FPGA, ASIC, DSP, or the like.

Read only memory (ROM) 170 stores programs related to automatic focus control (AF control), automatic exposure control (AE control), light emission control of an electronic flash, and the like to be executed by controller 130. Further, ROM 170 stores a program for integrally controlling the entire operation of digital camera 100. ROM 170 stores various conditions and settings related to digital camera 100.

ROM 170 does not necessarily have to be mounted outside controller 130 (as a member separated from controller 130). Alternatively, ROM 170 may be mounted inside controller 130. In the present exemplary embodiment, ROM 170 is a flash ROM.

Random access memory (RAM) 150 functions as a working memory for digital image and sound processor 120 and controller 130. RAM 150 can be achieved by a synchronous dynamic random access memory (SDRAM) or a flash memory, for example. RAM 150 functions also as an internal memory in which image information, a sound signal, and the like are recorded.

External storage medium 160 is a detachable memory device containing a nonvolatile storage element such as a flash memory inside. External storage medium 160 is a memory card such as a secure digital (SD) card, for example. External storage medium 160 records image data and sound data to be processed by digital image and sound processor 120 as a moving image file in accordance with control of controller 130.

Operation unit 180 is a general name of at least one of operation interfaces such as an operation button and an operation dial disposed on an exterior of digital camera 100. Operation unit 180 receives operation performed by a user. For example, operation unit 180 includes a release button, a power switch, and a mode dial provided on an upper surface of digital camera 100, and includes a center button, a cross button, and the like provided on the rear surface of digital camera 100. Further, operation unit 180 also includes the touch panel of display unit 190. When receiving operation performed by the user, operation unit 180 informs controller 130 of signals instructing various operations.

[1-2. Operation]

Digital camera 100 of the present exemplary embodiment can capture a moving image. A sound as well as an image is recorded in capturing of the moving image. When the moving image is captured, digital camera 100 displays a microphone level which is display indicating a level of an input analog sound signal in display unit 190.

Figure 3:
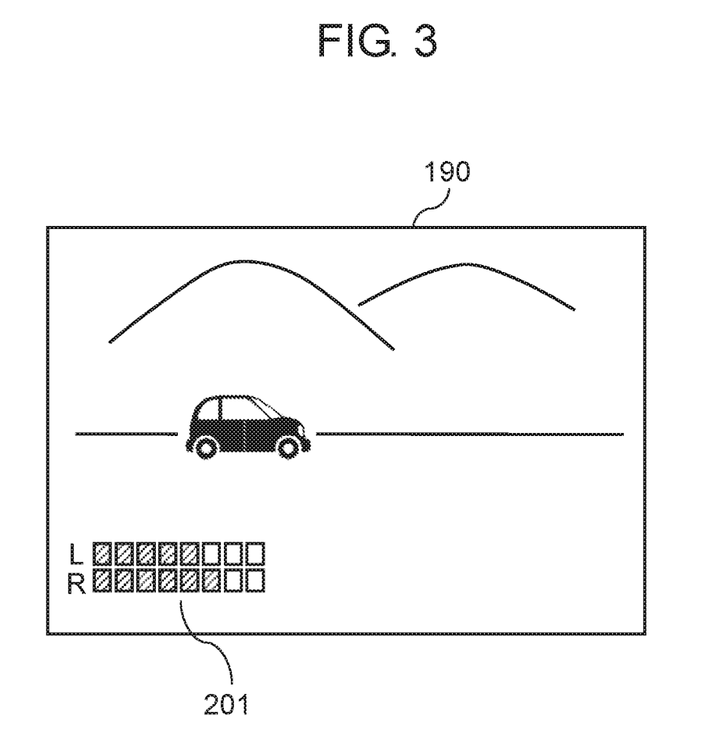
FIG. 3 is a view illustrating a display example of a level meter that indicates a level of an input sound signal.

FIG. 3 is a view describing a display example of a level meter displayed in display unit 190 of digital camera 100 when the moving image is captured. Level meter 201 is displayed in a lower left area of a screen of display unit 190. Level meter 201 changes a display state of level meter 201 according to magnitude of a microphone level of each microphone 111L, 111R. A user can grasp an input level of a sound by referring to level meter 201 during capturing of the moving image.

Figure 4:
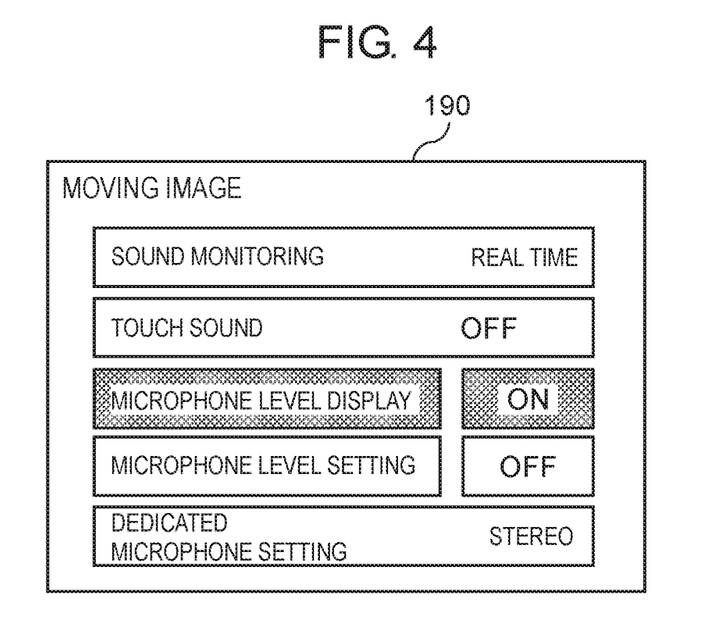
FIG. 4 is a view illustrating an example of a screen for setting ON/OFF of a microphone level display function.

In digital camera 100, a user can set whether level meter 201 is displayed in display unit 190. FIG. 4 is a setting screen for performing various settings related to capturing of the moving image in digital camera 100. From an item "microphone level display" in this setting screen, the user can set display or non-display of level meter 201. Specifically, when the microphone level display is set to "ON", level meter 201 is displayed in display unit 190. When the microphone level display is set to "OFF", level meter 201 is not displayed in display unit 190. In an example in FIG. 4, the microphone level display is set to "ON" such that level meter 201 is displayed. Controller 130 controls display or non-display of level meter 201 according to setting of the microphone level display.

Figure 5:
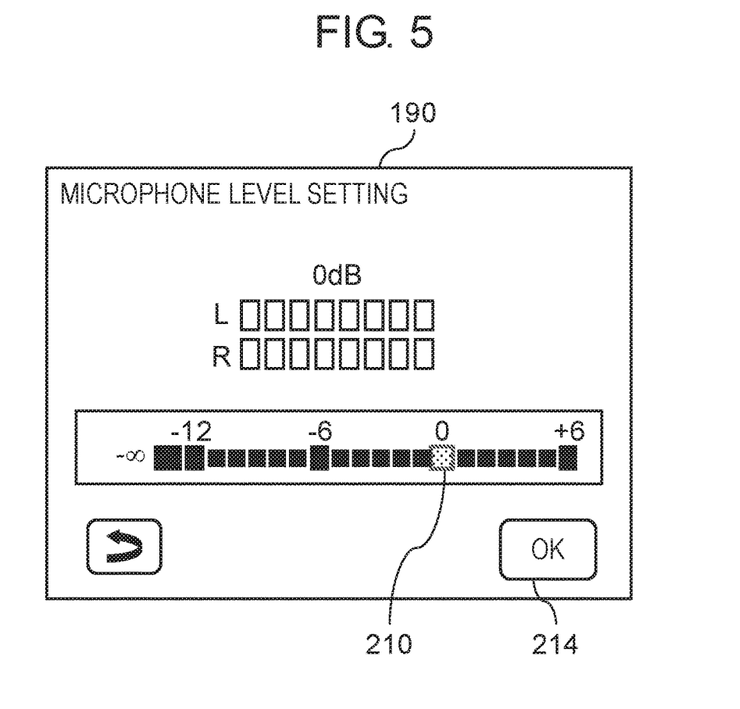
FIG. 5 is a view illustrating an example of a screen for setting a microphone level.

Furthermore, a user can set the microphone level in digital camera 100. FIG. 5 is a setting screen for setting the microphone level. In the setting screen illustrated in FIG. 5, the microphone level is set in a range from −12 dB to +6 dB. In the setting screen in FIG. 5, the user can set the microphone level to a desired level by moving cursor 210 to a position of the desired level and pressing down OK button 214. According to setting of the microphone level, controller 130 controls the gain of analog sound processor 115 and controls the microphone level.

In the setting screen illustrated in FIG. 5, the microphone level can be also set to minus infinity (−∞) dB as a minimum set value lower than −12 dB. When the microphone level is set to the minimum set value, a mute function is set to ON in digital camera 100. The mute function is a function which does not record sound input via sound input unit 111, that is, a function of recording silence. In other words, when the mute function is set to ON during capturing of the moving image, digital camera 100 records sound data indicating silence (for example, a value of the data is 0) together with image data, regardless of a level of an input sound.

Figure 6:
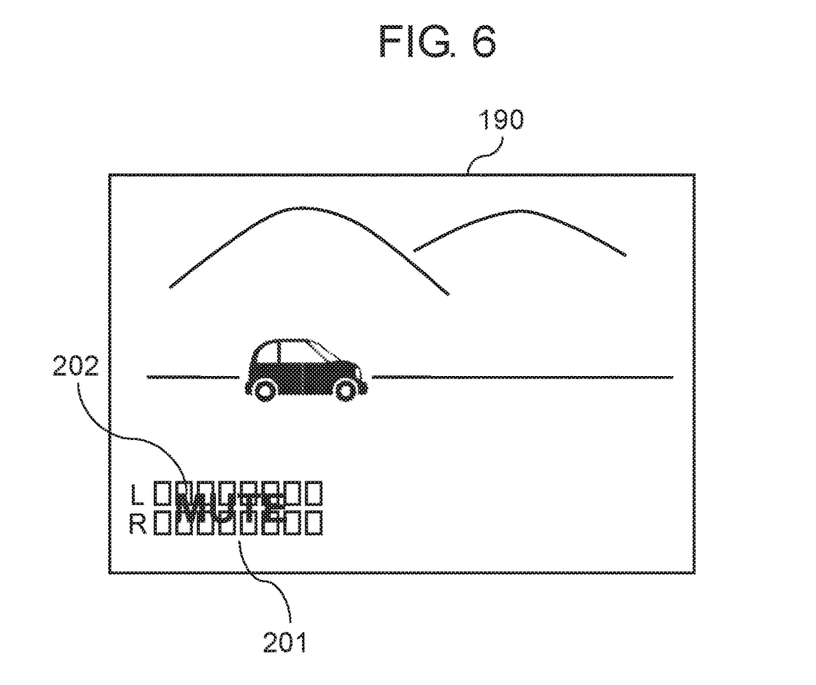

When the mute function is set to ON, digital camera 100 displays display for informing a user that the mute function is set to ON (hereinafter referred to as a mute display) in display unit 190. FIG. 6 is a view illustrating one example of such a mute display. In display unit 190, characters 202 of "MUTE" are displayed by superposing characters 202 on level meter 201. The user can grasp that the mute function is turned ON in digital camera 100 from this mute display. Hence, it is possible to prevent a silent moving image from being captured against a user's intention, without knowing that the mute function is set to ON.

As illustrated in FIG. 6, characters 202 of "MUTE" are displayed by superposing characters 202 on level meter 201. Since characters 202 of "MUTE" are disposed by superposing characters 202 on level meter 201 in this way, the user can simultaneously grasp that the mute function is set to ON upon referring to level meter 201. Characters 202 of "MUTE" may be displayed in a conspicuous color, such as red.

Figure 7:
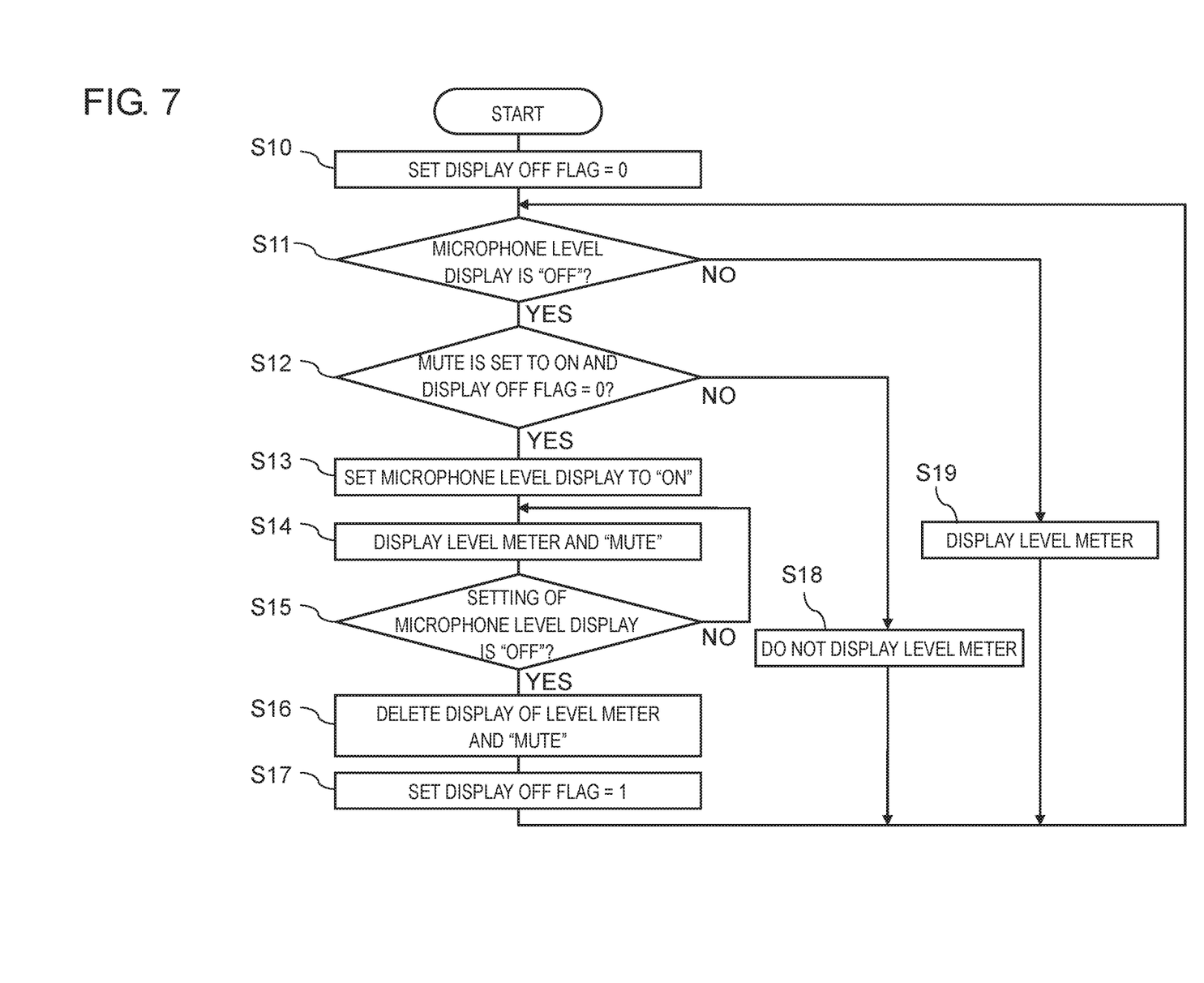
FIG. 7 is a flowchart related to a display process of a level meter in a digital camera according to a first exemplary embodiment.

FIG. 7 is a flowchart related to a display process of level meter 201 when the moving image is captured by digital camera 100. With reference to the flowchart in FIG. 7, the display process of level meter 201 in digital camera 100 is described below. The process in FIG. 7 is mainly executed by controller 130 in digital camera 100. The process in FIG. 7 is started when a power supply in digital camera 100 is turned ON, for example.

Controller 130 first sets a display OFF flag to "0" (S10). Herein, the display OFF flag is a flag indicating whether a user accepts that the microphone level display is turned OFF. "0" indicates that the user does not accept that the microphone level display is turned OFF, and "1" indicates that the user accepts that the microphone level display is turned OFF.

Controller 130 determines whether "microphone level display" for setting display or non-display of level meter 201 (see FIG. 4) is set to OFF (non-display) (S11).

If the microphone level display is set to ON (display) (NO in S11), controller 130 displays level meter 201 in display unit 190 according to setting of the microphone level display (S19).

If the microphone level display is set to OFF (YES in S11), controller 130 determines whether the mute function is set to ON and the display OFF flag is set to "0" (S12).

At first, the display OFF flag is set to "0". Hence, if the mute function is set to OFF (NO in S12), controller 130 does not display level meter 201 in display unit 190 according to setting of the microphone level display (S18).

On the other hand, if the mute function is set to ON (YES in S12), controller 130 sets the microphone level display to ON (S13). Furthermore, as illustrated in FIG. 6, controller 130 displays level meter 201 and characters 202 of "MUTE" in display unit 190 (S14).

If the mute function is turned ON in this way, even though the microphone level display is set to OFF (non-display), level meter 201 and characters 202 of "MUTE" are displayed. With this configuration, a user can be informed more reliably that the mute function is currently set to ON in digital camera 100. By referring to this display, when the user finds out that the mute function is set to ON against his or her intention, he or she can perform sound recording by changing the setting. As a result, the user can be prevented from capturing a silent moving image unintentionally.

While the microphone level display is set to ON (NO in S15), controller 130 continuously displays level meter 201 and characters 202 of "MUTE" in display unit 190 (S14).

When setting of the microphone level display is changed to OFF by the user (YES in S15), controller 130 deletes display of level meter 201 and "MUTE" 202 in display unit 190 (S16). In digital camera 100 of the present exemplary embodiment, when the microphone level display is set to OFF by the user after level meter 201 and "MUTE" 202 are displayed, the display of level meter 201 and "MUTE" 202 is deleted in deference to the user's intention.

If setting of the microphone level display is changed to OFF by the user, it is considered that the user accepts turning OFF of the microphone level display. Hence, controller 130 sets the display OFF flag to "1" (S17), and the process returns to step S11.

Since the microphone level display is set to OFF at this time, in step S11, the process proceeds to step S12. Then, controller 130 determines whether the mute function is set to ON and the display OFF flag is set to "0" (S12). Herein, since the display OFF flag is set to "1" in previous step S17, controller 130 does not display level meter 201 (S18). The above-described process is repeated hereinafter.

As described above, in digital camera 100 of the present exemplary embodiment, even though the microphone level display is set to OFF, if the mute function is set to ON, the level meter and the characters of "MUTE" are displayed in display unit 190 contrary to setting of the microphone level display. This enables reduction of a possibility that a user does not notice mute setting and a silent moving image is recorded against his or her intention.

[1-3. Effects Etc.]

Digital camera 100 (one example of an imaging apparatus) in the present exemplary embodiment images a subject and allows recording of moving image data. Digital camera 100 includes sound input unit 111, display unit 190, operation unit 180 (one example of a setting unit), and controller 130 (one example of a control unit). Sound input unit 111 inputs a sound and generates a sound signal. Display unit 190 displays level meter 201 indicating a level of the sound signal output from sound input unit 111. Operation unit 180 receives first setting (that is, setting of a microphone level display) for setting ON or OFF of display of the level meter on the display unit and second setting for setting ON or OFF of a mute function that is a function of recording a sound indicating silence. Controller 130 controls the display of level meter 201 on display unit 190.

When a moving image is captured, if the display of the level meter is set to ON (NO in S11) in the first setting, controller 130 displays the level meter in display unit 190 (S19). On the other hand, if the display of the level meter is set to OFF (YES in S11) in the first setting, and further, when the mute function is set to OFF (NO in S12) in the second setting, controller 130 does not display the level meter in display unit 190 (S18). Alternatively, when the mute function is set to ON (YES in S12) in the second setting, controller 130 displays the level meter and a mute display in display unit 190 (S14).

With the above-described configuration, even when the microphone level display is set to OFF, if the mute function is set to ON, level meter 201 and characters 202 of "MUTE" are displayed in display unit 190 contrary to setting of the microphone level display. As a result, a user can reliably recognize that the mute function is set to ON. Accordingly, it is possible to reduce a possibility that the user does not notice mute setting and a silent moving image is recorded against his or her intention. Hence, user's erroneous operation related to the mute function can be reduced.

Further, in the first exemplary embodiment, since a moving image can be recorded in silence, in editing work using a personal computer, for example, sound data is not displayed in a display unit of the personal computer. Alternatively; certain data indicating silence is displayed. Therefore, when a user wants to edit a silent moving image, unnecessary data or troublesome data does not come into user's view during the editing work, thereby enhancing convenience of the user. The editing work can be executed by an electronic terminal and the like other than the personal computer.

If the mute function is set to ON and when level meter 201 is displayed in display unit 190, controller 130 may display display 202 (one example of a mute display) indicating that the mute function is set to ON by superposing display 202 on the level meter or at a position near the level meter. As a result, a user can reliably recognize that the mute function is set to ON.

Further, if the mute function is set to ON and level meter 201 is displayed in display unit 190 (S14), and when the microphone level display is set to OFF (S15), controller 130 may not display level meter 201 in display unit 190 (S11, S12, S18). This makes it possible to attain convenience of the user in deference to his or her intention of not wishing to display level meter 201 in display unit 190.

Note that, in the first exemplary embodiment, both the level meter and the mute display are displayed in step S14, but at least one of the level meter and the mute display may be displayed. As a result, a user can reliably recognize that the mute function is set to ON. Therefore, it is possible to reduce a possibility that a user does not notice mute setting and a silent moving image is recorded against his or her intention. Hence, user's erroneous operation related to the mute function can be reduced.

Second Exemplary Embodiment

Digital camera 100 according to the present exemplary embodiment is configured in a similar manner to digital camera 100 described in the first exemplary embodiment. Digital camera 100 has an on screen display (OSD) function of displaying predetermined information on display unit 190. The predetermined information displayed by the OSD function includes a shooting mode, a shutter speed, exposure, ON/OFF of an electronic flash, a battery residual quantity, level meter 201, and the like. In Digital camera 100, the OSD function can be set to ON or OFF. When the OSD function is set to ON, the predetermined information is displayed in display unit 190. When the OSD function is set to OFF, the predetermined information is not displayed in display unit 190.

In the first exemplary embodiment, the display process of level meter 201 related to ON or OFF setting of the microphone level display has been described. In the present exemplary embodiment, a display process of level meter 201 related to ON or OFF setting of the OSD function is described.

Figure 10:
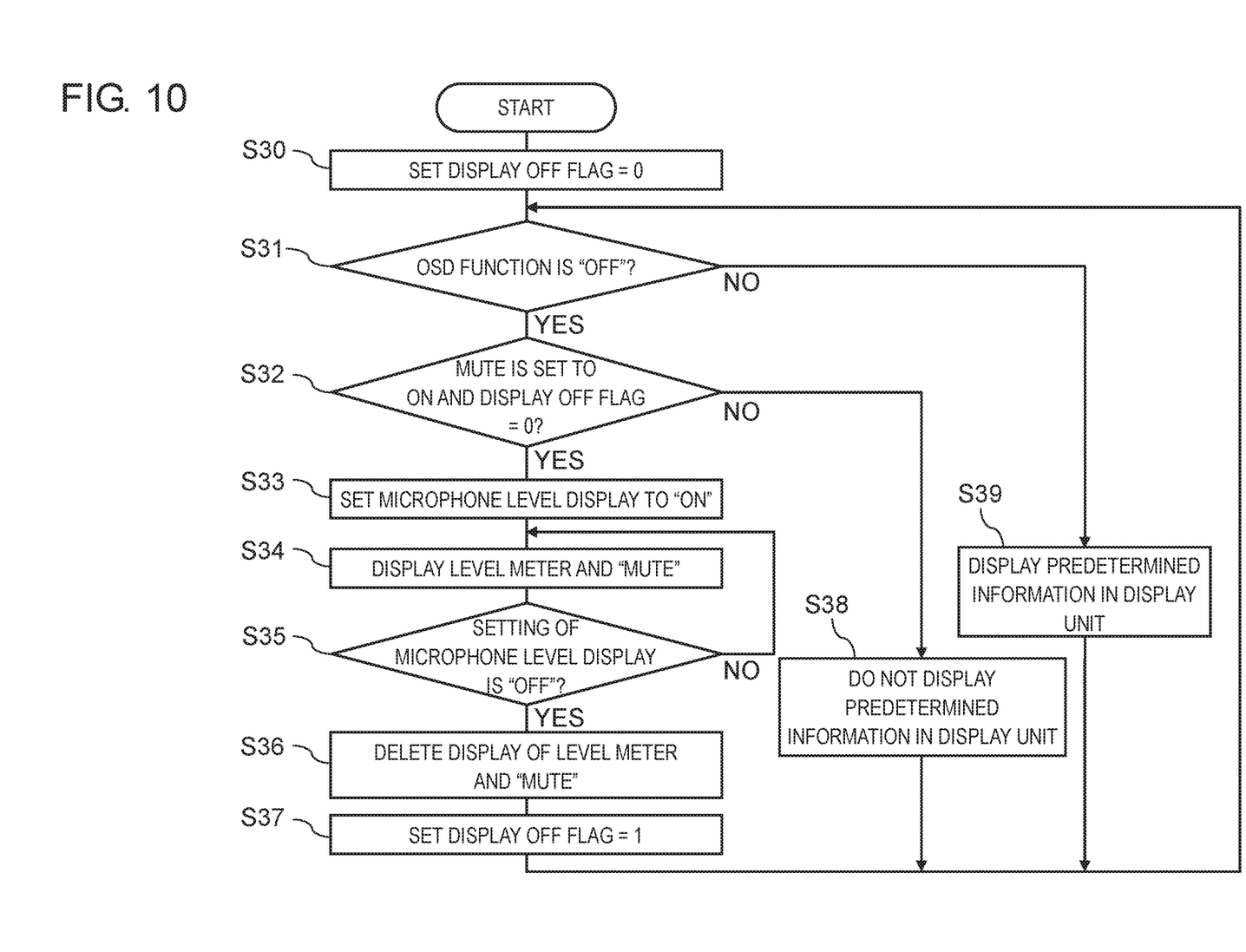
FIG. 10 is a flowchart related to a display process of a level meter in a digital camera according to a second exemplary embodiment.

FIG. 10 is a flowchart related to the display process of level meter 201 when a moving image is captured by digital camera 100 in the second exemplary embodiment. With reference to the flowchart in FIG. 10, the display process of level meter 201 in digital camera 100 is described below.

Controller 130 first sets a display OFF flag to "0" (S30). As with the first exemplary embodiment, the display OFF flag is a flag indicating whether a user accepts that, the microphone level display is turned OFF.

Controller 130 determines whether the OSD function is set to OFF (non-display) (S31).

If the OSD function is set to ON (display) (NO in S31), controller 130 displays the predetermined information including level meter 201 in display unit 190 according to ON setting of the OSD function (S39).

If the OSD function is set to OFF (non-display) (YES in S31), controller 130 determines whether a mute function is set to ON and the display OFF flag is set to "0" (S32).

At first, the display OFF flag is set to "0". Hence, if the mute function is set to OFF (NO in S32), controller 130 does not display the predetermined information including level meter 201 in display unit 190 according to OFF setting of the OSD function (S38).

On the other hand, if the mute function is set to ON (YES in S32), controller 130 sets the microphone level display to ON (S33). Furthermore, as illustrated in FIG. 6, controller 130 displays level meter 201 and characters 202 of "MUTE" in display unit 190 (S34).

If the mute function is turned ON in this way, even though the OSD function is set to OFF (non-display), level meter 201 and characters 202 of "MUTE" are displayed. With this configuration, a user can be informed more reliably that the mute function is currently set to ON in digital camera 100.

While the microphone level display is set to ON (NO in S35), controller 130 continuously displays level meter 201 and characters 202 of "MUTE" in display unit 190 (S34).

When setting of the microphone level display is changed to OFF by the user (YES in S35), controller 130 deletes display of level meter 201 and "MUTE" 202 in display unit 190 (S36). When the microphone level display is set to OFF by the user after level meter 201 and "MUTE" 202 are displayed, the display of level meter 201 and "MUTE" 202 is deleted in deference to the user's intention.

If setting of the microphone level display is changed to OFF by the user, it is considered that the user accepts turning OFF of the microphone level display. Hence, controller 130 sets the display OFF flag to "1" (S37), and the process returns to step S31.

Since the microphone level display is set to OFF at this time, in step S31, the process proceeds to step S32. Then, controller 130 determines whether the mute function is set to ON and the display OFF flag is set to "0" (S32). Herein, since the display OFF flag is set to "1" in previous step S37, controller 130 does not display level meter 201 (S38). The above-described process is repeated hereinafter.

As described above, in digital camera 100 of the present exemplary embodiment, even though the OSD function is set to OFF, if the mute function is set to ON, the level meter and the characters of "MUTE" are displayed in display unit 190 contrary to setting of the microphone level display. This enables reduction of a possibility that a user does not notice mute setting and a silent moving image is recorded against his or her intention.

Note that, in the second exemplary embodiment, both the level meter and the mute display are displayed in step S34, but at least one of the level meter and the mute display may be displayed. As a result, a user can reliably recognize that the mute function is set to ON. Therefore, it is possible to reduce a possibility that a user does not notice mute setting and a silent moving image is recorded against his or her intention. Hence, user's erroneous operation related to the mute function can be reduced.

Other Exemplary Embodiments

The first and second exemplary embodiments have been described above as examples of the technique disclosed in the present application. However, the technique in the present disclosure is not limited to these embodiments, but is applicable to other exemplary embodiments including appropriate modifications, substitutions, additions, omissions, and the like. In addition, new exemplary embodiments can be made by combining components described in the first and second exemplary embodiments.

In the above-described exemplary embodiments, as an example of display displayed when the mute function is set to ON, the characters of "MUTE" are displayed by superposing the characters on level meter 201, as illustrated in FIG. 6. However, a display method is not limited to this display.

Figure 8:
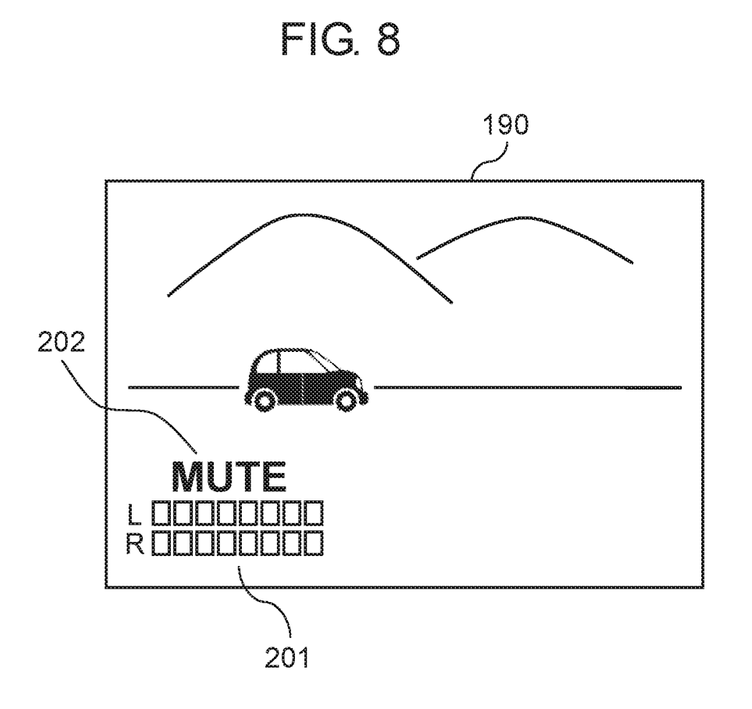

For example, as illustrated in FIG. 8, characters 202 of "MUTE" may be disposed near level meter 201 such that characters 202 are not superposed on level meter 201. With this configuration, characters 202 of "MUTE" are displayed near a position familiar to a user as a display position of information related to a microphone level. Accordingly, a possibility that characters 202 of "MUTE" are overlooked by the user is reduced.

Figure 9:
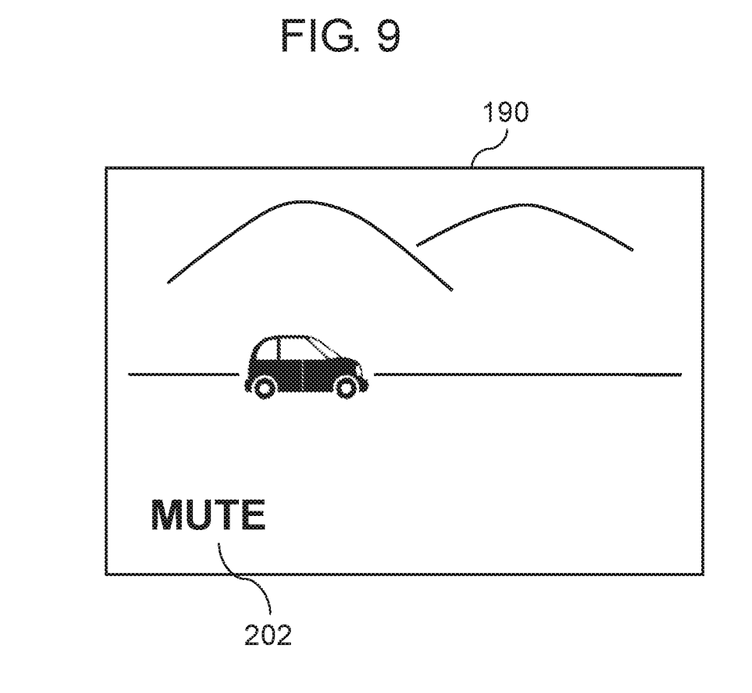

Further, as illustrated in FIG. 9, only characters 202 of "MUTE" may be displayed without displaying level meter 201. In this case, characters 202 of "MUTE" are displayed at or near a position at which level meter 201 is normally displayed. With this configuration, characters 202 of "MUTE" are displayed near a position familiar to a user as a display position of information related to a microphone level. Accordingly, a possibility that characters 202 of "MUTE" are overlooked by the user is reduced.

Further, as the information for informing a user that the mute function is set to ON, another kind of information (a text, an image) may be displayed instead of the characters of "MUTE".

In the above-described exemplary embodiment, digital camera 100 has the function of displaying the level meter. However, the function of displaying the level meter is not essential to digital camera 100. In other words, digital camera 100 is an imaging apparatus that images a subject and allows recording of moving image data, and may include: sound input unit 111 that inputs a sound and generates a sound signal; operation unit 180 (one example of a setting unit) that receives setting of ON or OFF of a mute function which is a function of recording a sound indicating silence; display unit 190 that displays a mute display indicating that the mute function is set to ON; and controller 130 (one example of a control unit) configured to display the mute display in display unit 190. With this configuration, when capturing a moving image, a user can easily notice that the mute function is set to ON.

The digital camera may have a lens and a body that are integrated with each other, although the digital camera in the foregoing exemplary embodiments has an interchangeable lens.

Further, the imaging apparatus of the present disclosure may be any given electronic device other than a digital camera. The imaging apparatus of the present disclosure may be any other electronic device that inputs a sound, such as a video camera or a smartphone.

The exemplary embodiments have been described herein as examples of the technique in the present disclosure. For this purpose, the accompanying drawings and the detailed description have been provided.

Accordingly, the components described in the attached drawings and the detailed description may include not only the components essential for solving the problem but also components that are not essential for solving the problem in order to illustrate the technique. For this reason, even if these unessential components are described in the accompanying drawings and the detailed descriptions, these unessential components should not be immediately approved as being essential.

Further, since the above exemplary embodiments illustrate the technique in the present disclosure, various modifications, substitutions, additions and omissions can be performed within the scope of claims and equivalent scope of claims.

INDUSTRIAL APPLICABILITY

An imaging apparatus of the present disclosure can reduce user's erroneous operation related to a mute function and can be applied to various electronic devices (a video camera, an IC recorder, and the like) configured to input a sound by converting the sound to an electric signal.

REFERENCE MARKS IN THE DRAWINGS 100 digital camera (imaging apparatus)
102 camera body
111 sound input, unit
111L, 111R microphone
115 analog sound processor
120 digital image and sound processor
130 controller (control unit)
143 CCD image sensor
160 external storage medium
180 operation unit (setting unit)
190 display unit
201 level meter
202 characters (mute display)
301 interchangeable lens

The invention claimed is:

1. An imaging apparatus that images a subject and records moving image data, the imaging apparatus comprising:
a microphone that inputs a sound and generates a sound signal;
a display that displays a level meter indicating a level of the sound signal output from the microphone;
an interface that receives first setting for setting ON or OFF of display of the level meter on the display and second setting for setting ON or OFF of a mute function, the mute function being a function of recording a sound indicating silence; and
a hardware controller that controls the display of the level meter on the display,
wherein when a moving image is captured, the hardware controller is configured such that,
(1) when the display of the level meter is ON in the first setting, the level meter is displayed on the display, and
(2) when the display of the level meter is OFF in the first setting, and further, in the second setting,
(i) when the mute function is OFF, the level meter is not displayed on the display, and
(ii) when the mute function is ON, at least one of the level meter and a mute display indicating that the mute function is ON is displayed on the display, and
wherein, when the mute function is ON, the microphone level is set to a minimum set value lower than −12 dB.

2. The imaging apparatus according to claim 1, wherein if the mute function is ON in the second setting and the level meter is displayed on the display, the hardware controller is configured such that the mute display is displayed (1) by superposing the mute display on the level meter or (2) at a position near the level meter.

3. The imaging apparatus according to claim 1, wherein when the mute function is ON in the second setting and the level meter is displayed on the display, and when the display of the level meter is set to OFF in the first setting, the hardware controller causes the level meter not to be displayed on the display.

4. The imaging apparatus according to claim 1, wherein the first setting is to select either one of display and non-display of only the level meter on the display.

5. The imaging apparatus according to claim 1, wherein the first setting is to select either one of display and non-display of predetermined information including the level meter on the display.

6. The imaging apparatus according to claim 1, further comprising an imaging unit that images a subject and generates a moving image signal,
wherein the hardware controller records moving image data based on the moving image signal and the sound signal on a recording medium.

7. The imaging apparatus according to claim 1, wherein:
when the display of the level meter is OFF in the first setting, and further, in the second setting,
(ii) when the mute function is ON, either the level meter or the level meter and a mute display indicating that the mute function is ON is displayed on the display.

* * * * *